W. R. DENMAN.
METHOD OF MAKING TIRE CASINGS.
APPLICATION FILED JULY 29, 1915.
1,172,115.
Patented Feb. 15, 1916.
3 SHEETS—SHEET 1.
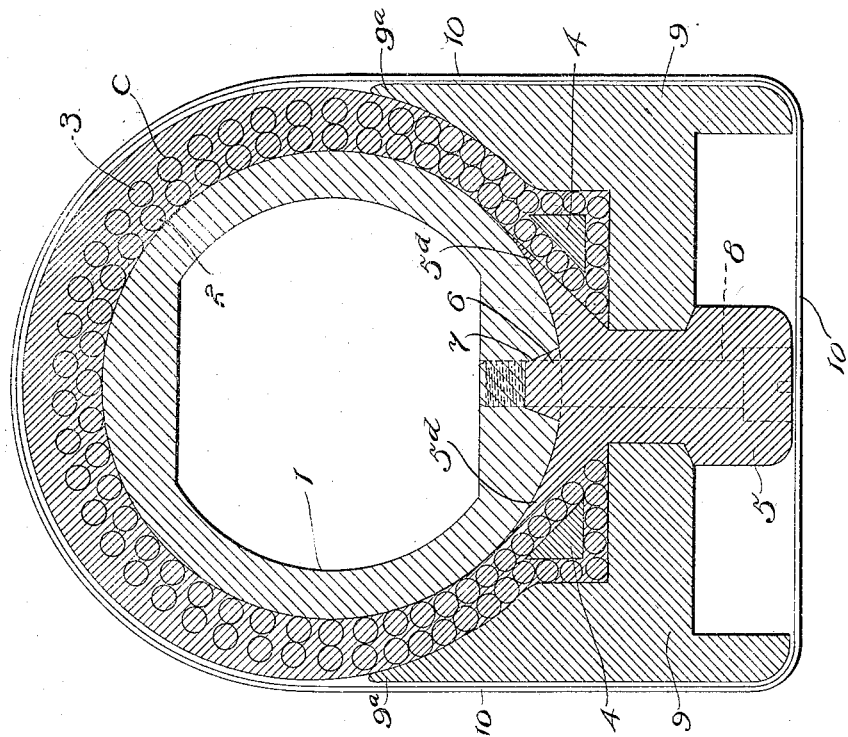
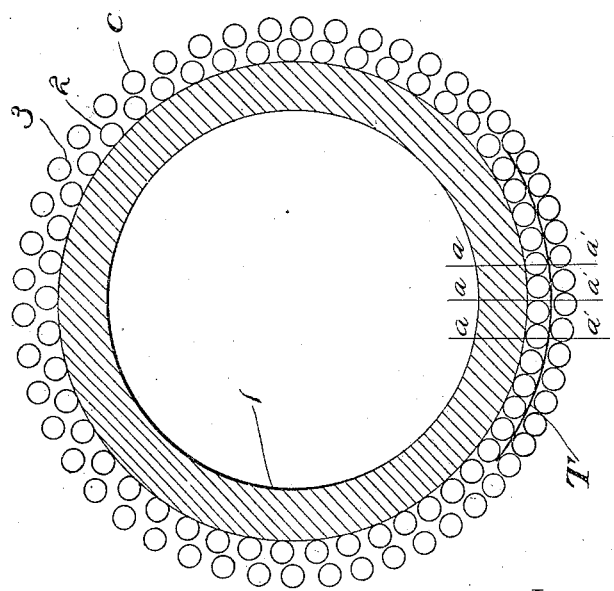
Inventor:
Walter R Denman.
by Charles E Parsons
Atty

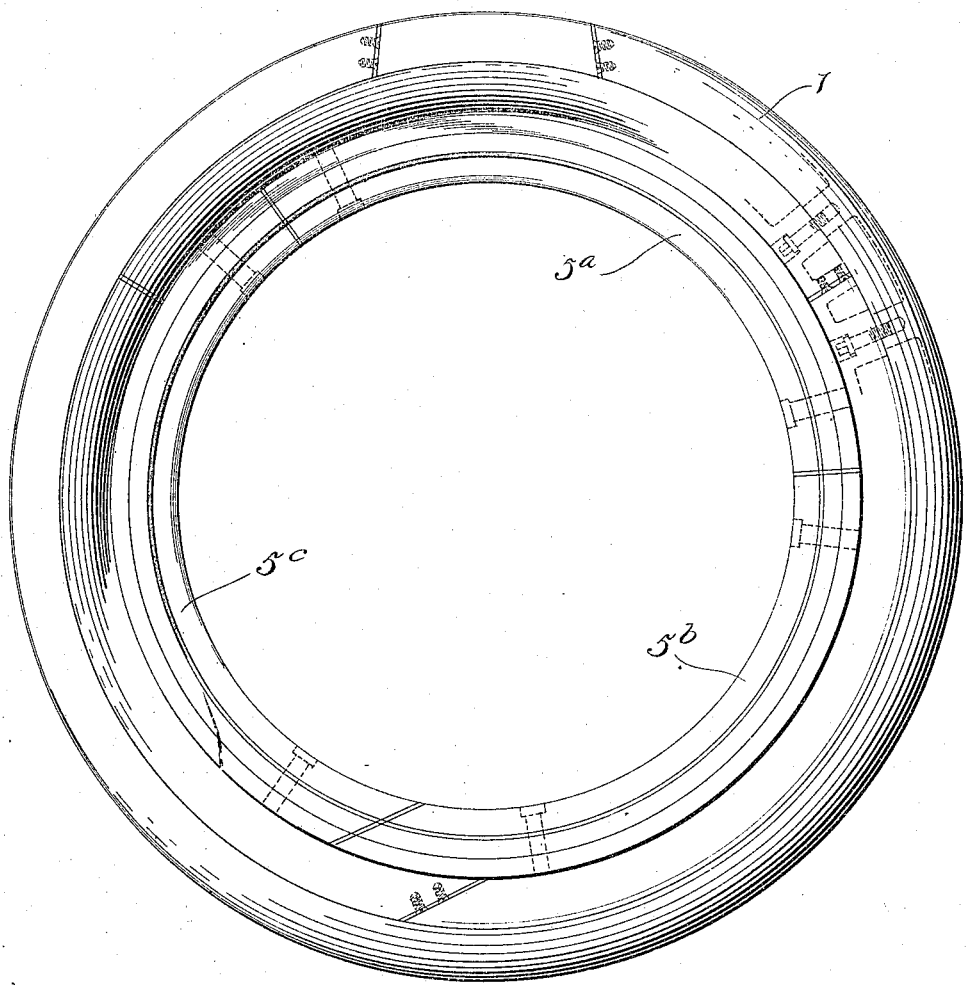

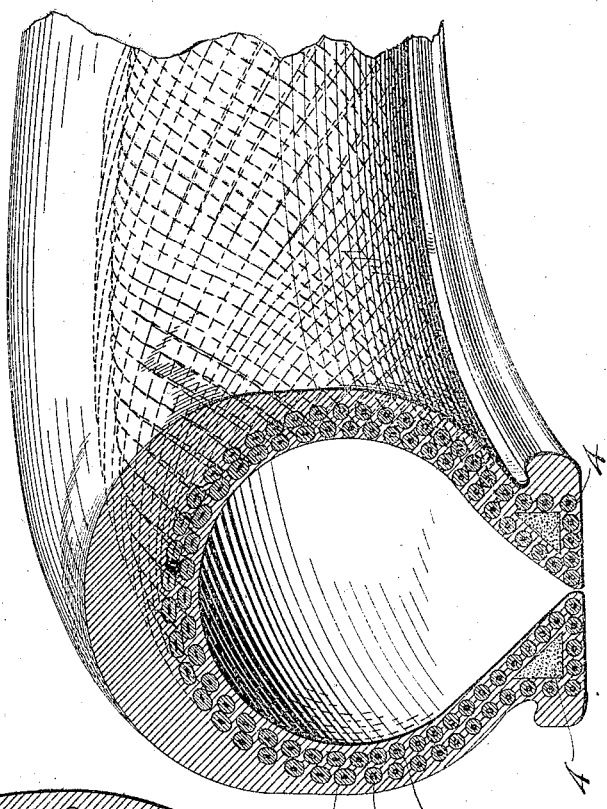
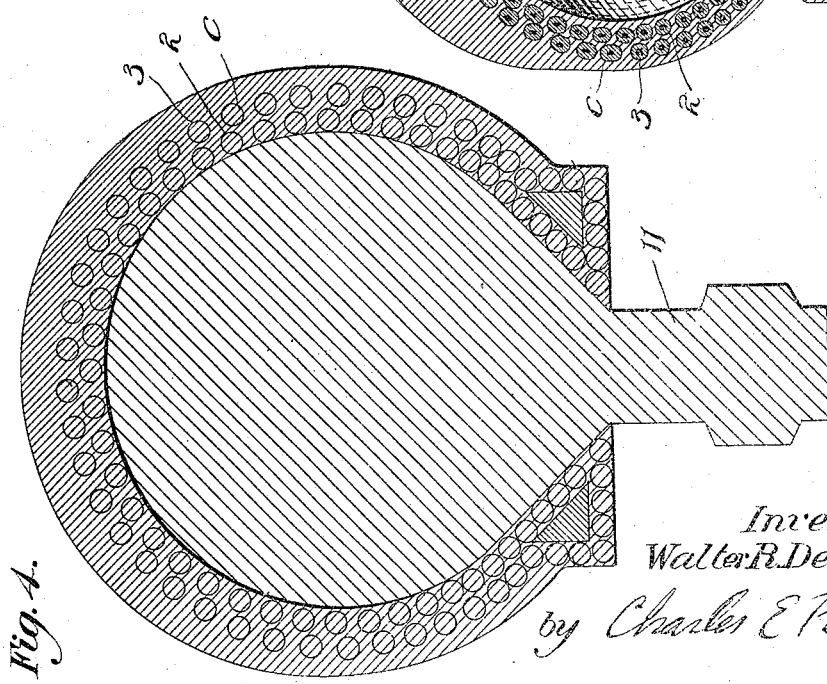

UNITED STATES PATENT OFFICE.

WALTER R. DENMAN, OF AKRON, OHIO, ASSIGNOR TO MILLER RUBBER COMPANY, A CORPORATION OF OHIO.

METHOD OF MAKING TIRE-CASINGS.

1,172,115.  Specification of Letters Patent.  Patented Feb. 15, 1916.

Application filed July 29, 1915. Serial No. 42,619.

*To all whom it may concern:*

Be it known that I, WALTER R. DENMAN, citizen of the United States, residing at Akron, in the county of Summit and State of Ohio, have invented certain new and useful Improvements in Methods of Making Tire-Casings, of which the following is a specification.

The present invention relates to improvements in the manufacture of pneumatic tire shoes and pertains more particularly to certain novel steps in the method of constructing a cord carcass for same.

The invention relates particularly to the building of a cord carcass for a pneumatic tire shoe and is an improvement in the method described and covered by the copending application of Richard Griffith, filed October 10, 1914, Serial Number 866,133.

The present invention has for its principal object to provide an improved method of constructing a cord carcass for pneumatic tires whereby the winding, building and vulcanizing can all be accomplished without removing the tire shoe from the original winding core.

A further object of the invention consists in so constructing the tire shoe around the cord carcass that the bead material, which forms the foundation for the clencher rim of the tire shoe can be easily and efficaciously applied in a semi-cured state before the tire casing is subjected to the vulcanizing process, and hence will receive all the benefits to be derived by the vulcanizing step.

A still further object of the invention consists in providing a method of constructing a cord carcass in such manner as to subject the cords to the proper degree of tension during the winding and consequently obviate the necessity of internal pressure, now used in vulcanizing the tire, to provide the necessary amount of tension of the tire casing.

It is the purpose of this application to illustrate and describe the invention according to one method, by way of example; but the method may be modified in various ways without departing from the spirit of the invention. for instance the cord carcass might be removed from the winding core and placed on a separate core, upon which the completing of the tire casing may be accomplished and the vulcanization of the whole effected.

With these and other objects in view, the invention consists in the combination and arrangement of parts more fully described in the accompanying specification, illustrated in the accompanying drawings and pointed out in the appended claims.

In the drawings: Figure 1 is an enlarged transverse section showing the first step, with the cord carcass wound on the ring core. Fig. 2 is a similar view showing entire casing ready for vulcanization. Fig. 3 is a plan view of the ring core and detachable supporting ring secured thereto with the side rings removed. Fig. 4 is an enlarged transverse sectional view of a modified form of a combined building ring core. Fig. 5 is a fragmentary perspective view of a finished tire casing constructed according to the present invention.

Referring now to the drawing particularly Figs. 1 and 2, a hollow, collapsible core 1 is provided upon which superimposed layers 2 and 3 of cord $c$ are spirally wound, the angle of inclination of the cords in the upper layer 3 being reversed to that of the cords of the lower layer 2. The hollow collapsible core 1 upon which the layers of cord are wound may be of any suitable form as for example similar to that described in my copending application filed of even date herewith, Serial Number 42,618.

The cords are themselves composed of separate threads coated with a rubberized solution and twisted spirally to form the cord unit. The inner layer 2 is first applied to the hollow core 1, being wrapped spirally, completely around the outer surface of the core. The winding of the layers 2 and 3 about the core 1 is effected with the cords $c$ under tension and the subsequent steps in the process of completing the tire casing are such that this tension will be maintained throughout. After the inner layer 2 has been completely wound about the core 1, a sheet of tin foil T is laid upon the outer surface of the cords $c$ at the inner periphery of the tube thus built. The second outer layer 3 is then wound upon the layer 2 with the cords disposed at a reverse angle to the circumferential surface of the core. After the two layers 2 and 3 have been completely wrapped upon the core 1 under tension and in superposed relation to each other, the cords of the layers are slit on the lines a—a', a—a', a—a', along the inner periphery. The ends of the cord layers 2 and 3 can then be separated slightly at each side of the opening, since the tin foil T prevents their adhering to one another, and the bead cores 4 of semi-cured hard rubber can be interposed between these open ends. The tin foil T is all removed after the layers 2 and 3 have been cut open. The core 1 is then removed from the winding machine and the section ring 5 composed of the adjoining segment $5^a$, $5^b$ and $5^c$ is attached thereto along the peripheral opening formed at the inter-circumference of the cord carcass.

In order to properly position and maintain the ring 5 with the core 1 bosses or protuberances 6 are provided on the former adapted to enter correspondingly formed recesses 7 in the latter. Threaded bolts 8 enter bores extending inwardly through the ring 5 and centrally through the bosses 6, entering screw threaded openings in the recesses 7. Before the ring 5 is applied to the core 1 the recess 7 can be suitably filled by caps, so as to present a smooth, unbroken, exterior surface for the winding operation. The outer tread and side parts of the tire casing are then built and side rings 9 applied as shown in Fig. 2 and the whole wrapped with cloth 10 and vulcanized. The side plates 9 are rings made each in a single piece and of cross section shown in Fig. 2. By carefully referring to Fig. 2 it will be seen that the outer surface of the ring 5 conforms to the contour of the inner surface of the core 1, tapering outwardly with their edges $5^d$ on either side within the tire casing. The inner and upper edges of the side rings 9 are also curved and tapering upward to provide the side extensions $9^a$ on either side at the outerside of the tire casing.

It will thus be seen that as the cloth 10 is wrapped about the entire structure there is a wedging action exerted on the lower bead edges of the tire casing by the ends $5^d$ and inner surfaces of the side rings 9, tending to maintain an even tension on the sides of the tire casing throughout the vulcanization. Thus while the entire shoe or casing is being vulcanized there is a maintained pressure which subjects the cord carcass to a constant tension accomplishing a result which is frequently obtained by means of an internal pressure fluid in other methods.

A tire shoe may be constructed according to the steps hereinbefore described by using a combined building ring core such as the one shown in Fig. 4 and designated by the reference 11. When such a core is employed the cord carcass is removed from the winding core 1 illustrated in Fig. 1 and placed around the core 11, then the said rings 9 are applied as in the previous instance and the structure wrapped about with the wrapping cloth W and vulcanized.

What I claim is:—

1. The herein described method of forming a tire shoe, or casing consisting in winding a plurality of superimposed plies of parallel flexible cords under tension completely around a ring core, slitting the carcass thus formed along its inner circumference, inserting bead cores at suitable points between the cord plies, building up the casing on the cord carcass, applying supporting rings to the ring core and at the sides of the casing respectively, wrapping the whole with cloth under tension and vulcanizing the whole while still on the ring core.

2. The herein described method of building a tire shoe or casing consisting in wrapping a plurality of superimposed plies of flexible coated cords completely around a ring core, interposing a strip of non-adhesive material between the inner and outer plies along the inner periphery of their circumference, slitting the cord carcass thus formed along its inner periphery, inserting bead cores on either side between the ends of the inner and outer plies, building up a tire casing over the carcass, applying suitable former rings to the ring core and at the sides of the tire casing, respectively, wrapping the entire structure with cloth under tension, and vulcanizing the whole while still on the ring core.

3. The herein described method of forming a tire shoe or casing consisting in wrapping a plurality of superimposed plies of parallel, flexible cords spirally around a ring core at reverse angles thereto, slitting the cord carcass along its inner periphery, applying the bead cores, building up the tread and side portions of the shoe and vulcanizing the whole, while distended and while still on the winding or ring core.

In testimony whereof I affix my signature in presence of two witnesses.

WALTER R. DENMAN.

Witnesses:
C. A. WOLF,
HAROLD WILSON.